(No Model.)

J. N. GOODALL.
HAME FASTENER.

No. 541,741.　　　　　　　Patented June 25, 1895.

WITNESSES:
John A. Rennie.
W. B. Hutchinson

INVENTOR
J. N. Goodall
BY Munn & Co.
ATTORNEYS.

UNITED STATES PATENT OFFICE.

JOHN N. GOODALL, OF PORTSMOUTH, NEW HAMPSHIRE.

HAME-FASTENER.

SPECIFICATION forming part of Letters Patent No. 541,741, dated June 25, 1895.

Application filed November 26, 1894. Serial No. 529,935. (No model.)

*To all whom it may concern:*

Be it known that I, JOHN N. GOODALL, of Portsmouth, in the county of Rockingham and State of New Hampshire, have invented a new and Improved Hame-Strap, of which the following is a full, clear, and exact description.

My invention relates to improvements in hame straps such as are used to fasten together the lower ends of harness hames; and the object of my invention is to produce a simple and efficient device, which takes the place of the ordinary strap and buckle, which may be instantly and easily applied to the hames, which securely clamps the two ends of the hames together, which may be adjusted by simply turning a thumb piece on one or both ends of the device, which has means for connection with a pole strap, which when released is adapted to hang on the hames, and which in general affords a very simple and positive means of fastening the hames together.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
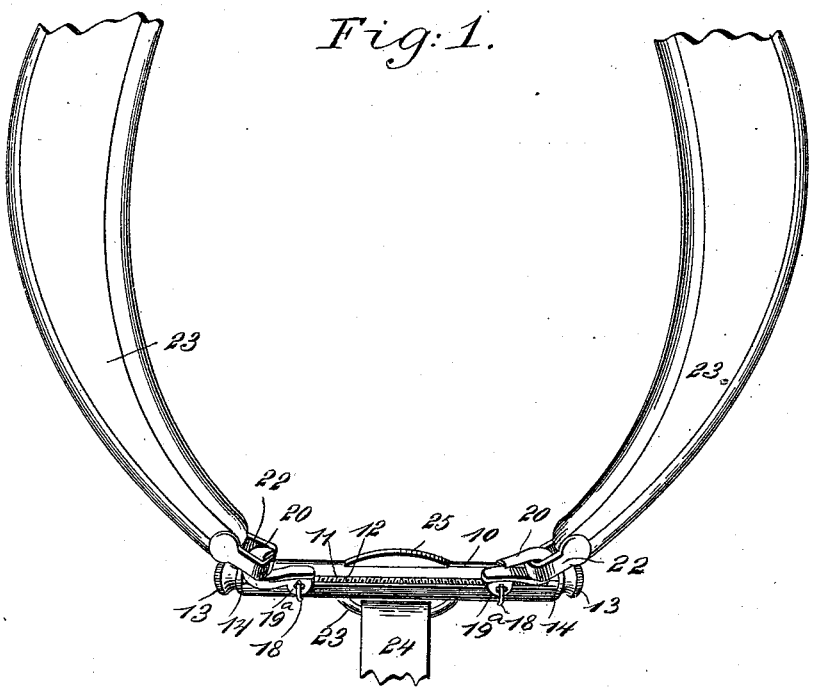
Figure 2:
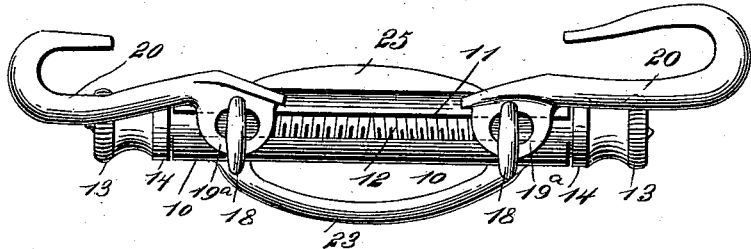
Figure 3:
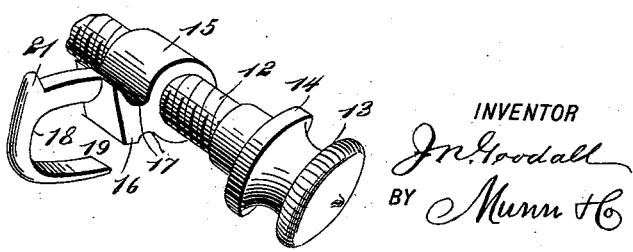

Figure 1 is a rear elevation of my improved fastening device as applied to a pair of hames. Fig. 2 is an enlarged detail rear view of the device or strap, and Fig. 3 is a broken detail view of the adjusting-screw and one of the nuts and hooks carried thereby.

The device has a hollow barrel 10 which is longitudinally slotted on one side, as shown at 11, and extending longitudinally through the barrel is a screw 12, the opposite end portions of which are of opposite pitch, that is to say, one end of the screw has a left thread and the other a right, and the ends of the screw which project from the barrel are provided with milled thumb pieces 13 by which the screw may be turned, these pieces having flanges 14 to abut with the ends of the barrel and prevent its displacement in relation to the screw. Each end portion of the screw is provided with a nut 15, the nuts being threaded to fit the corresponding parts of the screw, so that when the screw is turned in one direction, the nuts being held from turning will be moved longitudinally toward each other, while by reversing the screw, the nuts are moved apart. Each nut 15 has a boss 16 on one side, which has side grooves 17 to receive the edges of the barrel on opposite sides of the slot 11, and thus the nut is prevented from turning and the boss slides smoothly along the slot 11. The boss 16 of each nut has an outwardly projecting hook 18 thereon, the opening 19 of the hook being sufficiently large to receive the eyes 19ᵃ of the hooks 20, and after the eyes 19ᵃ are in position, the hooks 18 are closed up sufficiently to prevent the eyes from slipping off the hooks. The hooks 18 have shoulders 21 on their backs, as shown in Fig. 3, and these shoulders are adapted to engage the sides of the eyes 19ᵃ and prevent the latter from slipping around the hook and so getting the hooks 20 into an inconvenient position for use, but the eyes 19ᵃ are elongated so that by turning the hooks 20 up at right angles to the position shown in Fig. 2, the eyes may be slipped over the shoulders 21.

The hooks 20 of the strap are adapted to engage the eyes 22 at the lower end of the hames 23, and in order that the device may hang on the hames when not in use, without too much danger of displacement and loss, one of the hooks 20 has its bow elongated, as shown at the right-hand in Figs. 1 and 2, so that it may retain its grip on the eye 22, even when the opposite hook is hanging loose.

The barrel 10 has on one side, the under side when it is in position for use, an eye 23 which is adapted to receive the pole strap 24. Opposite the eye 23 on the other side of the barrel is preferably a rib 25, which stiffens the barrel, and by balancing the eye 23 improves the appearance of the device.

When the strap is used the hooks 20 are placed in engagement with the eyes 22 of the hames, and to enable this to be done, the nuts 15 which carry the hooks 20 are of course near the outer ends of the screw 12. Then by turning either of the thumb pieces 13 in the right direction, the screws turn and the nuts are forced toward each other, thus drawing inward on the hooks 20 and securely clamping the hames 23. It will be seen that by the simple turning of the thumb pieces 13, the hames may be tightened or loosened.

Having thus described my invention, I claim as new and desire to secure by Letters Patent—

1. A hame strap, comprising a slotted barrel, a revoluble screw extending through the barrel and provided with right and left threads, nuts carried by the screw and projecting through the slot, and hooks on the nuts to engage the eyes of the hames, substantially as described.

2. A hame strap, comprising a longitudinally slotted barrel, a screw extending through the barrel and provided with right and left threads, suitable thumb pieces on the ends of the screw, nuts carried by the screw and projecting through the slot of the barrel, and hooks pivotally attached to the nut, substantially as described.

3. The combination, with the longitudinally slotted barrel and the screw journaled therein, of the nuts mounted on the screw and provided with projections which extend through the slot and are grooved to fit the edges thereof, and the hooks pivotally secured to the projections of the nuts, substantially as described.

4. The combination, with the slotted barrel, the screw therein and the nuts carried by the screw and provided with projections extending through the slot, of the hooks rigid on the nuts and provided with shoulders, and the hame engaging the hooks pivoted on the nut hooks near the shoulders, substantially as described.

JOHN N. GOODALL.

Witnesses:
WILLIAM H. ROLLINS,
CHARLES E. LOWD.